United States Patent
Zhang et al.

(10) Patent No.: US 12,229,703 B1
(45) Date of Patent: Feb. 18, 2025

(54) INTELLIGENT ANALYSIS METHOD FOR OPERATIONAL SUPERVISION OF PUBLIC TRANSPORTATION INDUSTRY AND SYSTEM THEREOF

(71) Applicant: Nan Jing Intelligent Transportation Information Co. Ltd, Nanjing (CN)

(72) Inventors: Tao Zhang, Nanjing (CN); Qi Tao, Nanjing (CN); Zaixiang Wei, Nanjing (CN); Yan Peng, Nanjing (CN); Ying Hu, Nanjing (CN); Fei Ren, Nanjing (CN); Jian Wang, Nanjing (CN); Qi Zhang, Nanjing (CN); Menghan Yao, Nanjing (CN)

(73) Assignee: Nan Jing Intelligent Transportation Information Co. Ltd, Nanjing (CN)

( * ) Notice: Subject to any disclaimer, the term of this patent is extended or adjusted under 35 U.S.C. 154(b) by 0 days.

(21) Appl. No.: 18/664,056

(22) Filed: May 14, 2024

(30) Foreign Application Priority Data

Sep. 22, 2023 (CN) .......................... 202311233186.0

(51) Int. Cl.
  *G06Q 10/0637* (2023.01)
  *G06Q 50/40* (2024.01)
  *G08G 1/01* (2006.01)

(52) U.S. Cl.
  CPC ......... *G06Q 10/0637* (2013.01); *G06Q 50/40* (2024.01); *G08G 1/0125* (2013.01)

(58) Field of Classification Search
  CPC .. G06Q 10/06313; G06Q 50/40; G06Q 10/04; G06Q 10/0631; G06Q 10/06315; G08G 1/123; G08B 25/016
  See application file for complete search history.

(56) References Cited

U.S. PATENT DOCUMENTS

2021/0142670 A1* 5/2021 Kamiya ................. G08G 1/127

FOREIGN PATENT DOCUMENTS

CN 114912736 A * 8/2022
CN 115547052 A * 12/2022
(Continued)

OTHER PUBLICATIONS

Translation of CN 116895144 A (Year: 2023).*
(Continued)

*Primary Examiner* — Jerry O'Connor
*Assistant Examiner* — Michael R Koester
(74) *Attorney, Agent, or Firm* — JCIPRNET

(57) ABSTRACT

An intelligent analysis method for operational supervision of public transportation industry and a system thereof includes operation information collection, calculation of basic vehicle information and platform passenger flow information, current operation analysis of target vehicles, current data update and calibration of the target vehicles, automatic adjustment of dispatching operation plans for public transportation vehicles within operation areas, and real-time updates of real-time data of online vehicles within the operation areas. The present invention implements vehicle energy consumption monitoring and statistical analysis based on basic information and mileage information of public transportation vehicles, and performs intelligent dispatching and makes preferred planning in terms of road network congestion, charging station operations and site traffic for dispatching and subsequent operations of the entire transportation network based on energy consumption and the location of charging stations on public transport operation lines.

7 Claims, 3 Drawing Sheets

(56) References Cited

FOREIGN PATENT DOCUMENTS

CN           116895144 A * 10/2023
WO    WO-2023065389 A1 * 4/2023 ........... G06Q 10/047

OTHER PUBLICATIONS

Translation of WO 2023065389 A1 (Year: 2023).*
M. Rinaldi, et al. "Optimal dispatching of electric and hybrid buses subject to scheduling and charging constraints," 2018 21st International Conference on Intelligent Transportation Systems (ITSC), Maui, HI, USA, 2018, pp. 41-46, <https://ieeexplore.ieee.org/document/8569706?source=IQplus> (Year: 2018).*

* cited by examiner

INTELLIGENT ANALYSIS METHOD FOR OPERATIONAL SUPERVISION OF PUBLIC TRANSPORTATION INDUSTRY AND SYSTEM THEREOF

TECHNICAL FIELD

The present invention relates to the field of intelligent transportation technology, in particular to an intelligent analysis method for operational supervision of public transportation industry and a system thereof.

BACKGROUND TECHNOLOGY

In recent years, with the continuous development of information technology such as cloud computing and the Internet of Things, public transportation enterprises have been applying new technologies to the management and services of public transportation and constructed comprehensive and precise dynamic supervision systems for service. The monitoring of public transportation operation status is based on data from the intelligent dispatching platform, and uses a visual interface to dynamically grasp the various operational indicators of the public transportation network in real time, which allows for monitoring of departure frequency, operating speed, punctuality, crowding, and other indicators.

However, current public transportation industry mainly operates new energy vehicles. Traditional new energy vehicles are often dispatched by using fixed timetables and manually dispatched by using a "fixed departure, fixed stops" method, which do not allow for real-time understanding of the energy status of vehicles on operating routes and the real-time congestion at stations. Relying solely on charging at the first and last stations for new energy vehicles will lead to certain blind spots and lag, which can not only cause congestion at a particular vehicle charging point, necessitating the expansion of charging stations, but also lead to the impact of overcharging or undercharging during the vehicle charging process, or result in excess energy consumption on low-traffic routes.

Therefore, there are energy and site congestion issues in bus operations based on the existing solution, and there is no dynamic adjustment at this stage, which leads to redundancy in the transportation operation system and congestion at sites, which is not conducive to the promotion and operation of smart transportation.

SUMMARY OF THE INVENTION

In view of the problems existing in the existing bus operation, the present invention is proposed.

The purpose of the present invention is to provide an intelligent analysis method for operation supervision of public transportation industry and a system thereof, so as to dispatch public transportation vehicles to achieve low-carbon operation based on operation information of public transportation vehicles, improve the optimization algorithm for dispatching public transportation vehicles and further enable monitoring and statistical analysis of vehicle energy consumption based on basic vehicle information and mileage data. Then the present invention performs intelligent dispatching based on energy consumption and the locations of charging stations along public transportation routes, avoids redundancy in the transportation operation system and congestion at stations, and is beneficial for the promotion and operation of smart transportation.

To solve the above technical problems, the invention provides the following technical solutions:

In one aspect, the present invention provides an intelligent analysis method for operational supervision of public transportation industry comprising:

S1—operation information collection, comprising dividing operation areas for public transportation vehicles and obtaining basic vehicle information, road network traffic light information, congestion information, platform monitoring information, historical platform passenger flow information, charging station information, and vehicle dispatching and operation information of target vehicles within operation areas, wherein the basic vehicle information comprises vehicle energy information, GPS location information and current number of passengers in vehicles, S2—calculation of basic vehicle information and platform passenger flow information, comprising analyzing and estimating energy of the target vehicles through the vehicle energy information, the GPS location information and the vehicle dispatching and operation information to obtain remaining energy information of the target vehicles; and based on the platform monitoring information within the operation areas, obtaining number of passengers waiting at platforms within the operation areas and real-time platform passenger flows on operation lines, and forming platform congestion information after analyzing and estimating number of passengers getting off at stations based on the historical platform passenger flow information, S3—current operation analysis of target vehicles, comprising based on the remaining energy information and the charging station information of the target vehicles, and combined with platform congestion information on routes where the target vehicles travel, using a greedy algorithm to analyze and obtain current preferred dispatching operation lines on the routes where the target vehicles travel, so as to park and charge, S4—current data update and calibration of the target vehicles, comprising performing real-time updates and calibration of time that the target vehicles take to charging station terminals based on the current preferred dispatching operation lines and updated platform congestion information, charging station information and remaining energy information, S5—automatic adjustment of dispatching operation plans for public transportation vehicles within operation areas, comprising automatically adjusting dispatching operation plans of public transportation vehicles at the charging station terminals based on operation lines of public transportation vehicles and real-time collected remaining platform congestion information, charging station information and remaining energy information; and S6—real-time updates of real-time data of online vehicles within the operation areas.

As a further preferred technical solution of the present invention, the "using a greedy algorithm to analyze and obtain current preferred dispatching operation lines on the routes where the target vehicles travel" of S3 specifically comprises:

S301—determining operation parameters of operation lines which comprise basic vehicle information, road network traffic light information, congestion information, platform monitoring information, historical platform passenger flow information, charging station information, and vehicle dispatching and operation information, and designing dispatching and operation models of public transportation vehicles;

S302—taking current operation durations of the target vehicles as preferred targets, namely, constraining issues of charging, entering stations to pick up passengers and travelled distances during operation of dispatching operation lines where the target vehicles travels; and S303—using the greedy algorithm to optimize and solve the issues of charging, entering stations to pick up passengers and travelled distances in S302 based on the dispatching and operation models of public transportation vehicles and the current operation durations of the target vehicles.

As a further preferred technical solution of the present invention, the issues of S303 are optimized and solved through following equations:

$$G(x) = \sum_{i=1}^{n} w_i x_i = t_c, \qquad (1)$$

where $t_c$ represents an operation duration of an ith target vehicle, and $w_i$ represents a pick-up duration of the ith target vehicle entering a station; and $$f(x) = \max \sum_{i=1}^{n} s_i p_i x_i, \qquad (2)$$

where $s_i$ represents a travelled distance of the ith target vehicle, and $p_i$ represents a charging duration of the ith target vehicle;

x refers to a solution vector and is defined as X={$x_1, x_2, x_3, \ldots, x_n$}, where x is a decision variable vector of a length n, f(x) represents an objective function, and G(x) represents a constraint function.

As a further preferred technical solution of the present invention, the basic vehicle information of S2 is specifically calculated as follows:

when the target vehicles are parked, driving ranges are updated according to remaining battery capacity and average energy consumption of historical driving, which specifically comprises:

obtaining current preset comprehensive power of the target vehicles based on the target vehicles' historical data and driving data of preset dispatching operation lines, determining average energy consumption models of preset historical driving of the target vehicles based on the target vehicles' historical driving data and historical battery data of battery capacity, obtaining available battery capacity of the target vehicles based on the average energy consumption models of preset historical driving, and determining driving ranges of the target vehicles and forming travelled distance information of the target vehicles based on the current preset comprehensive power and the available battery capacity of the target vehicles;

when the target vehicles are running, travelled distances and actual average energy consumption of current driving are obtained in real time, which specifically comprises:

weighting and obtaining average energy consumption of current driving based on actual average energy consumption of current driving and average energy consumption of previous driving, and using current remaining battery capacity and the average energy consumption of current driving to calculate the driving ranges and form the travelled distance information of the target vehicles.

As a further preferred technical solution of the present invention, a formula for calculating the average energy consumption of current driving is as follows:

$$Q_i = C_i(d/L_d) + L_i(1 - d/L_d) \qquad (3),$$

where $Q_i$ represents average energy consumption data of current driving, $C_i$ represents actual average energy consumption data of current driving, d represents current driving distance data, $L_d$ represents distance data for reaching charging station terminals, and $L_i$ represents average energy consumption data of previous driving.

As a further preferred technical solution of the present invention, the basic vehicle information, the road network traffic light information, the congestion information, the platform monitoring information, the historical platform passenger flow information, the charging station information, and the vehicle dispatching and operation information are transmitted through on-board units and roadside units at traffic sides.

As a further preferred technical solution of the present invention, the present invention further comprises dividing the operation areas of public transportation vehicles, managing multiple charging stations within the operation areas, dividing management areas into multiple areas, and dividing a day into multiple time loss level periods; and monitoring number of available charging piles in real time, counting number of vehicles entering and exiting stations through vehicle identification systems, obtaining current states of corresponding charging station terminals based on number of public transportation vehicles and available charging piles within the operation areas as well as time which the target vehicles take to reach charging station terminals on preferred dispatching operation lines, and then feeding back to the target vehicles.

In another aspect, the present invention provides a system of the intelligent analysis method for operational supervision of public transportation industry, comprising:

an operation information collection system, which is used to obtain basic vehicle information of the target vehicles, the road network traffic light information, the congestion information, the platform monitoring information, the platform historical passenger flow information, the charging station information, and the vehicle dispatching and operation information, wherein the operation information collection system comprises:

on-board units, which are used to obtain basic vehicle information of the target vehicles, historical platform passenger flow information, and vehicle dispatching and operation information, and are mounted in vehicles; roadside units, which are used to road network traffic light information and congestion information; platform intelligent monitoring and acquisition units, which are used to obtain information of platform passenger flows and numbers of passengers getting on and off platforms, and are installed on platforms; and charging station monitoring units, which are used to obtain charging station information;

an operation supervision server, which is used for calculation of basic vehicle information and platform passenger flow information, current operation analysis of target vehicles, data updates and calibration, calculation of time for subsequently reaching charging station terminals, automatic adjustment of dispatching operation plans of public transportation vehicles, and real-time updates of real-time data of online vehicles; and a dispatching terminal system, which is used to receive dispatching information from the operation supervision server and transmit the same to the target vehicles, and is used to dispatch the target vehicles within the operation areas.

The present invention is based on operation information of public transportation vehicles and uses dynamic programming algorithms to dispatch bus vehicles to achieve low-carbon operation, which specifically improves the optimization decisions for dispatching public transportation vehicles and further achieves monitoring and statistical analysis of vehicle energy consumption based on basic vehicle information and mileage data. Then the present invention performs intelligent dispatching based on energy consumption and the locations of charging stations along public transportation routes, avoids redundancy in the transportation operation system and congestion at stations, and is beneficial for the promotion and operation of smart transportation.

BRIEF DESCRIPTION OF THE DRAWINGS

In order to explain the technical solutions of the embodiments of the present invention more clearly, the drawings needed to be used in the description of the embodiments will be briefly introduced below. Obviously, the drawings in the following description are only some embodiments of the present invention. For those of ordinary skill in the art, other drawings can be obtained based on these drawings without exerting any creative effort.

Figure 1:
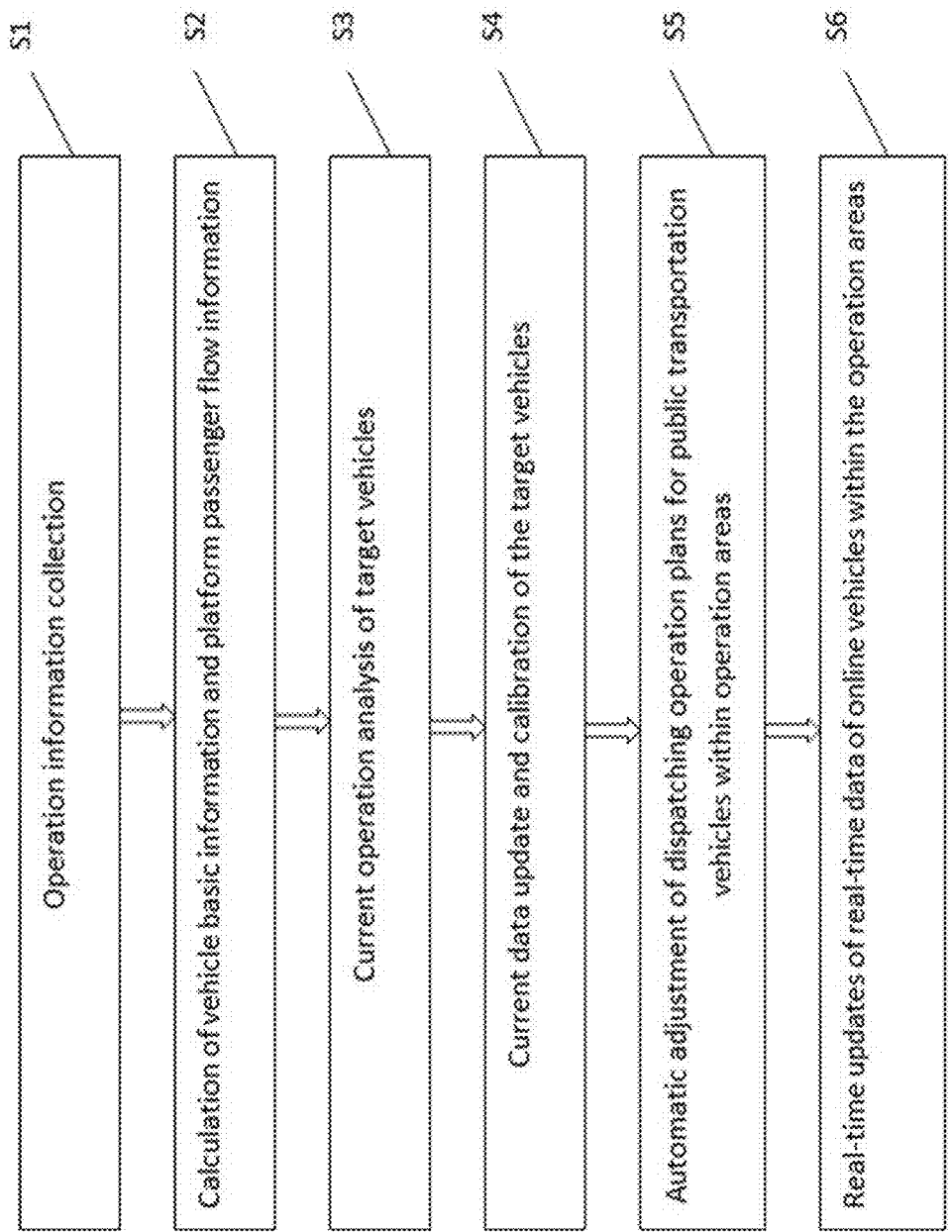
FIG. 1 is a flow chart of an intelligent analysis method for operational supervision of public transportation industry of the present invention.

The markups in the drawings are indicated as follows:
10—operation information collection system;
20—operation supervision server;
30—dispatching terminal system;
101—on-board unit;
102—roadside unit;
103—platform intelligent monitoring and acquisition unit; and
104—charging station monitoring unit.

Specific Embodiments

In order to make the purpose, technical solutions and advantages of embodiments of the present invention more clear, the technical solutions of the embodiments of the present invention will be clearly and completely described below in conjunction with the drawings of the embodiments of the present invention. Obviously, the described embodiments are some, but not all, of the embodiments of the present invention. Based on the described embodiments of the present invention, all other embodiments obtained by those of ordinary skill in the art shall fall within the scope of protection of the present invention.

Please refer to FIG. 1, an embodiment of the present invention provides an intelligent analysis method for operational supervision of public transportation industry comprising following steps:

S1—operation information collection, comprising dividing operation areas for public transportation vehicles and obtaining basic vehicle information, road network traffic light information, congestion information, platform monitoring information, historical platform passenger flow information, charging station information, and vehicle dispatching and operation information of target vehicles within operation areas, wherein the basic vehicle information comprises vehicle energy information, GPS location information and current number of passengers in vehicles.

S2—calculation of basic vehicle information and platform passenger flow information, comprising analyzing and estimating energy of the target vehicles through the vehicle energy information, the GPS location information and the vehicle dispatching and operation information to obtain remaining energy information of the target vehicles; and based on the platform monitoring information within the operation areas, obtaining number of passengers waiting at platforms within the operation areas and real-time platform passenger flows on operation lines, and forming platform congestion information after analyzing and estimating number of passengers getting off at stations based on the historical platform passenger flow information.

It should be emphasized that the basic vehicle information is specifically calculated as follows:
  when the target vehicles are parked, driving ranges are updated according to remaining battery capacity and average energy consumption of historical driving, which specifically comprises:
  obtaining current preset comprehensive power of the target vehicles based on the target vehicles' historical data and driving data of preset dispatching operation lines,
  determining average energy consumption models of preset historical driving of the target vehicles based on the target vehicles' historical driving data and historical battery data of battery capacity, and
  obtaining available battery capacity of the target vehicles based on the average energy consumption models of preset historical driving, and
  determining driving ranges of the target vehicles and forming travelled distance information of the target vehicles based on the current preset comprehensive power and the available battery capacity of the target vehicles;
  when the target vehicles are running, travelled distances and actual average energy consumption of current driving are obtained in real time, which specifically comprises:
  weighting and obtaining average energy consumption of current driving based on actual average energy consumption of current driving and average energy consumption of previous driving, and using current remaining battery capacity and the average energy consumption of current driving to calculate and obtain the driving ranges and forming the travelled distance information of the target vehicles.

Further, it is explained that a formula for calculating the average energy consumption of current driving is as follows:

$$Q_i = C_i(d/L_d) + L_i(1 - d/L_d) \qquad (3),$$

$Q_i$ represents average energy consumption data of current driving, where $C_i$ represents actual average energy consumption data of current driving, d represents current driving distance data, $L_d$ represents distance data for reaching charging station terminals, and $L_i$ represents average energy consumption data of previous driving.

Based on the above, it can be seen that in the present embodiment basic vehicle information and platform passenger flow information is calculated to obtain platform congestion information and remaining battery capacity information of target vehicles, so as to combine with following current operation analysis of target vehicles, carry out overall bus operation dynamic planning and covert big problems of congestion and energy consumption in operation of public transportation vehicles; and through dynamic programming, monitoring and statistical analysis of vehicle energy consumption is realized, and intelligent dispatching is performed based on energy consumption and charging station locations on operation lines of public transportation vehicles;

S3—current operation analysis of target vehicles, comprising based on the remaining energy information and the charging station information of the target vehicles, and combined with platform congestion information on routes where the target vehicles travel, using a greedy algorithm to analyze and obtain current preferred dispatching operation lines on the routes where the target vehicles travel, which is specifically as follows:

S301—determining operation parameters of operation lines which comprises basic vehicle information, road network traffic light information, congestion information, platform monitoring information, historical platform passenger flow information, charging station information, and vehicle dispatching and operation information, and designing dispatching and operation models of public transportation vehicles;

S302—taking current operation durations of the target vehicles as preferred targets, namely, constraining issues of charging, entering stations to pick up passengers and travelled distances during operation of dispatching operation lines where the target vehicles travels; and S303—using the greedy algorithm to optimize and solve the issues of charging, entering stations to pick up passengers and travelled distances in S302 based on the dispatching and operation models of public transportation vehicles and the current operation durations of the target vehicles.

The issues of S303 are optimized and solved through following equations:

$$G(x) = \sum_{i=1}^{n} w_i x_i = t_c, \quad (1)$$

where $t_c$ represents an operation duration of an ith target vehicle, and $w_i$ represents a pick-up duration of the ith target vehicle entering a station; and $$f(x) = \max \sum_{i=1}^{n} s_i p_i x_i, \quad (2)$$

where $s_i$ represents a travelled distance of the ith target vehicle, and $p_i$ represents a charging duration of the ith target vehicle;

x refers to a solution vector and is defined as $X=\{x_1, x_2, x_3, \ldots, x_n\}$, And where x is a decision variable vector of a length n, f(x) represents an objective function, and G(x) represents a constraint function.

Based on the above, it can be seen that the present invention is based on operation information of public transportation vehicles and uses dynamic programming algorithms to dispatch bus vehicles to achieve low-carbon operation, and under constraints of vehicle operation time, the present invention combines road network congestion with the platform passenger flows for dynamic optimization, which maximizes increase of vehicle travelled distances, improves the operation effect, effectively enables vehicles to charge and discharge, and avoids redundancy of power stations and congestion of stations.

S4—current data update and calibration of the target vehicles, comprising performing real-time updates and calibration of time that the target vehicles take to charging station terminals based on the current preferred dispatching operation lines and updated platform congestion information, charging station information and remaining energy information.

S5—automatic adjustment of dispatching operation plans for public transportation vehicles within operation areas, comprising automatically adjusting dispatching operation plans of public transportation vehicles at the charging station terminals based on operation lines of public transportation vehicles and real-time collected remaining platform congestion information, charging station information and remaining energy information.

S6—real-time updates of real-time data of online vehicles within the operation areas.

The basic vehicle information, the road network traffic light information, the congestion information, the platform monitoring information, the historical platform passenger flow information, the charging station information, and the vehicle dispatching and operation information are transmitted through on-board units and roadside units at traffic sides.

The present invention further comprises dividing the operation areas of public transportation vehicles, managing multiple charging stations within the operation areas, dividing management areas into multiple areas, and dividing a day into multiple time loss level periods; monitoring number of available charging piles in real time, counting number of vehicles entering and exiting stations through vehicle identification systems, obtaining current states of corresponding charging station terminals based on number of public transportation vehicles and available charging piles within the operation areas as well as time which the target vehicles take to reach charging station terminals on preferred dispatching operation lines, and then feeding back to the target vehicles.

Figure 2:
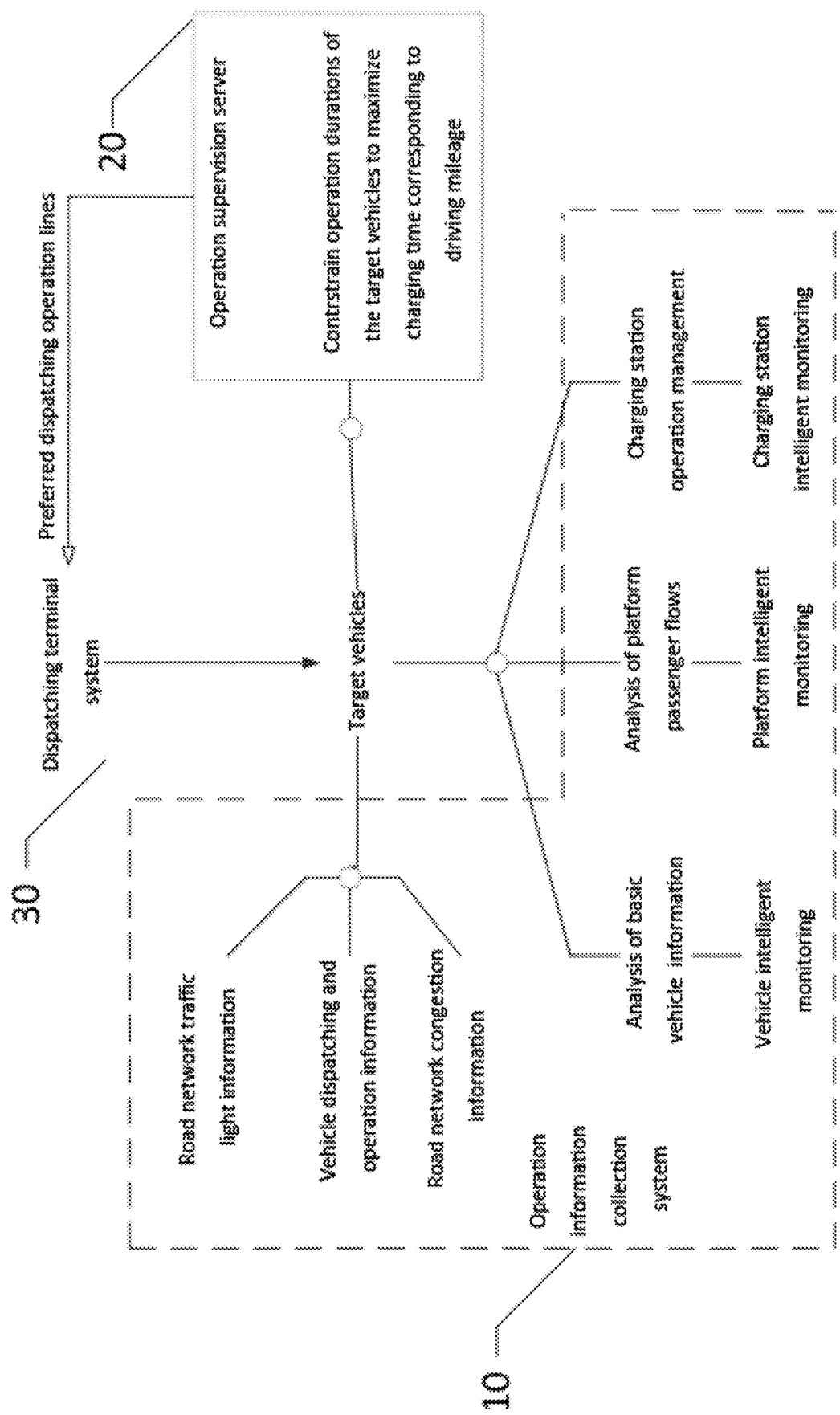
FIG. 2 is a schematic diagram of a modular structure of the intelligent analysis method for operational supervision of public transportation industry of the present invention.
Figure 3:
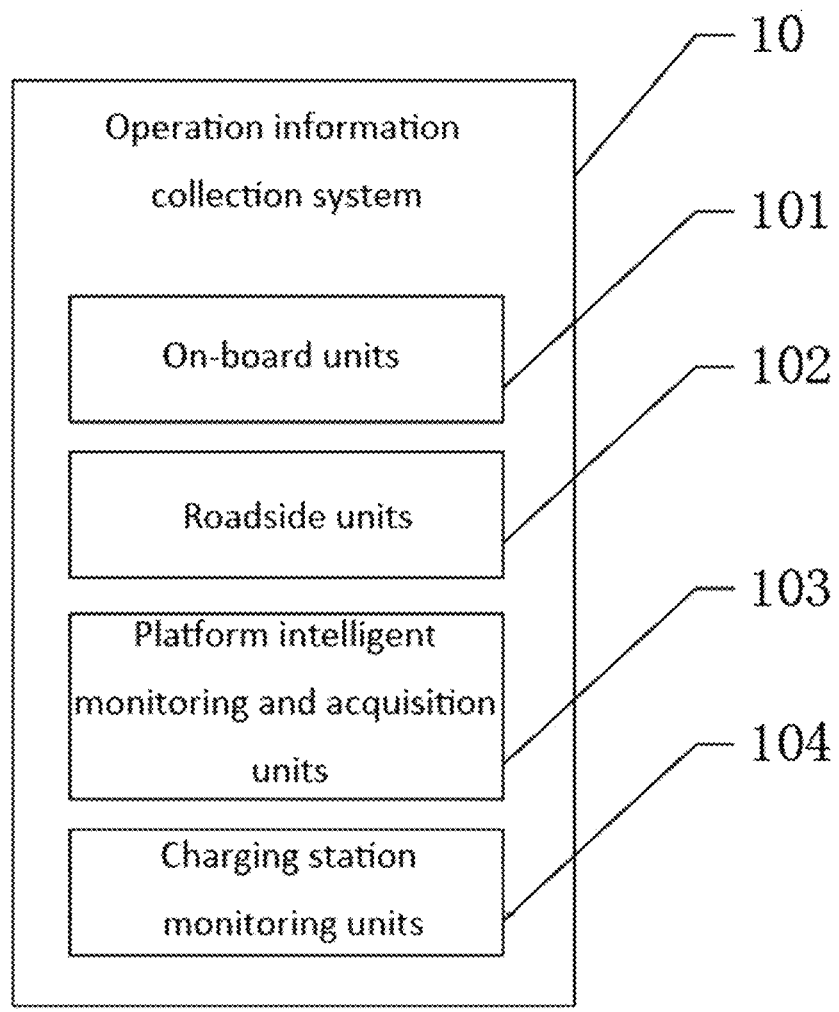
FIG. 3 is a schematic diagram of a modular structure of an information collection system of the present invention.

Please refer to FIGS. 2-3, an embodiment of the present invention provides an intelligent analysis system for operational supervision of public transportation industry, comprising:

an operation information collection system 10, which is used to obtain basic vehicle information of the target vehicles, the road network traffic light information, the congestion information, the platform monitoring information, the platform historical passenger flow information, the charging station information, and the vehicle dispatching and operation information;

an operation supervision server 20, which is used for calculation of basic vehicle information and platform passenger flow information, current operation analysis of target vehicles, data updates and calibration, calculation of time for subsequently reaching charging station terminals, automatic adjustment of dispatching operation plans of public transportation vehicles, and real-time updates of real-time data of online vehicles; and a dispatching terminal system 30, which is used to receive dispatching information from the operation supervision server and transmit the same to the target vehicles, and is used to dispatch the target vehicles within the operation areas.

Further, the operation information collection system 10 comprises:

on-board units 101, which are used to obtain basic vehicle information of the target vehicle, historical platform passenger flow information, and vehicle dispatching and operation information, and arranged in vehicles;

Roadside units 102, which are used to obtain road network traffic light information and congestion information;

platform intelligent monitoring and acquisition units 103, which are used to obtain information of platform passenger flows and numbers of passengers getting on and off platforms, and are installed on the bus stop platform; and charging station monitoring units 104, which are used to obtain charging station information.

To sum up, the present invention is based on operation information of public transportation vehicles and uses dynamic programming algorithms to dispatch bus vehicles to achieve low-carbon operation, which specifically improves the optimization decisions for dispatching public transportation vehicles and further achieves monitoring and statistical analysis of vehicle energy consumption based on basic vehicle information and mileage data. Then the present invention performs intelligent dispatching based on energy consumption and the locations of charging stations along public transportation routes, avoids redundancy in the transportation operation system and congestion at stations, and is beneficial for the promotion and operation of smart transportation.

In the above embodiments, it can be implemented in whole or in part by software, hardware, firmware, or any combination thereof. When implemented by using software, the present invention may be implemented in whole or in part in the form of a computer program product. A computer program product includes one or more computer instructions. When computer program instructions are loaded and executed on a computer, processes or functions according to the present application are produced, in whole or in part. The computer may be a general purpose computer, a special purpose computer, a computer network, or other programmable device. Computer instructions may be stored in or transmitted from one computer-readable storage medium to another computer-readable storage medium.

In the description of the present invention, the reference terms "an embodiment", "some embodiments", "examples", "specific examples", or "some examples", etc., are used to refer to specific features, structures, materials, or features incorporated in the embodiment or description of the example included in at least one embodiment or example of the present invention. Furthermore, the specific features, structures, materials, or characteristics described may be combined in any suitable manner in any one or more embodiments or examples. In addition, without contradicting each other, persons skilled in the art may combine and combine the different embodiments or examples described in this specification and the characteristics of different embodiments or examples. In addition, the terms "first" and "second" are used for descriptive purposes only and cannot be understood as indicating or implying relative importance or implicitly indicating the quantity of indicated technical features. Thus, a feature defined as "first" or "second" may explicitly or implicitly include at least one of these features, and in the description of the present invention, "plurality" means two or more than two, unless otherwise explicitly and specifically limited.

Any process or method descriptions in flowcharts or otherwise described herein may be understood to represent units, segments, or portions of code that include one or more executable instructions for implementing the specified logical functions or steps of the process. And the scope of the preferred embodiments of the present invention includes additional implementations in which the functions may not be performed in the order indicated or discussed, including in a substantially simultaneous manner or in reverse order depending on the functions involved. Logic and/or steps expressed in a flow chart or otherwise described herein, for example, may be thought of as a fixed sequence table of executable instructions for implementing a logical function, which may be concretely implemented in any computer-readable medium. For use by, or in combination with, an instruction executing system, device or device (such as a computer-based system, a system including a processor, or other system that can take instructions from and execute instructions from an instruction executing system, device or device).

The invention claimed is:

1. An intelligent method for optimizing operational supervision of smart public transportation vehicles comprising:
   executing a program stored in a memory through a processor to be configured to function as:
   S1—operation information collection, comprising dividing operation areas for smart public transportation vehicles and obtaining basic vehicle information, road network traffic light information, congestion information, platform monitoring information, historical platform passenger flow information, charging station information, and vehicle dispatching and operation information of target smart vehicles within operation areas, wherein the basic vehicle information comprises vehicle energy information, GPS location information and current number of passengers in vehicles;
   S2—calculation of basic vehicle information and platform passenger flow information, comprising analyzing and estimating energy of the target smart vehicles through the vehicle energy information, the GPS location information and the vehicle dispatching and operation information to obtain remaining energy information of the target smart vehicles; and based on the platform monitoring information within the operation areas, obtaining number of passengers waiting at platforms within the operation areas and real-time platform passenger flows on operation lines, and forming platform congestion information after analyzing and estimating number of passengers getting off at stations based on the historical platform passenger flow information;
   S3—current operation analysis of target smart vehicles, comprising based on the remaining energy information and the charging station information of the target smart vehicles, and combined with platform congestion information on routes where the target smart vehicles travel, using a greedy algorithm to analyze and obtain current preferred dispatching operation lines on the routes where the target smart vehicles travel, so as to park and charge, which specifically comprises as follows:

S301—determining operation parameters of operation lines which comprise basic vehicle information, road network traffic light information, congestion information, platform monitoring information, historical platform passenger flow information, charging station information, and vehicle dispatching and operation information, and designing dispatching and operation models of smart public transportation vehicles;

S302—taking current operation durations of the target smart vehicles as preferred targets, namely, constraining issues of charging, entering stations to pick up passengers and travelled distances during operation of dispatching operation lines where the target smart vehicles travels; and S303—using the greedy algorithm to optimize and solve the issues of charging, entering stations to pick up passengers and travelled distances in S302 based on the dispatching and operation models of smart public transportation vehicles and the current operation durations of the target smart vehicles, to obtain optimized charging station terminals for the target smart vehicles wherein the issues of S303 are optimized and solved through following equations:

$$G(x) = \sum_{i=1}^{n} w_i x_i = t_c, \quad (1)$$

wherein $t_c$ represents an operation duration of an ith target smart vehicle, and $w_i$ represents a pick-up duration of the ith target smart vehicle entering a station; and $$f(x) = \max \sum_{i=1}^{n} s_i p_i x_i, \quad (2)$$

wherein $s_i$ represents a travelled distance of the ith target smart vehicle, and $p_i$ represents a charging duration of the ith target smart vehicle;

x refers to a solution vector and is defined as $X=\{X1,X2,X3,\ldots,Xn\}$, wherein x is a decision variable vector of a length n, $f(x)$ represents an objective function, and $G(x)$ represents a constraint function;

S4—current data update and calibration of the target smart vehicles, comprising performing real-time updates and calibration of time which the target smart vehicles take to charging station terminals based on the current preferred dispatching operation lines and updated platform congestion information, charging station information and remaining energy information;

S5—automatic adjustment of dispatching operation plans for smart public transportation vehicles within operation areas, comprising automatically adjusting dispatching operation plans of smart public transportation vehicles at the charging station terminals based on operation lines of smart public transportation vehicles and real-time collected remaining platform congestion information, charging station information and remaining energy information;

S6—real-time updates of real-time data of online vehicles within the operation areas; and S7—automatically generating optimized routes to the optimized charging station terminals for the target smart vehicles, controlling the target smart vehicles to travel on the optimized routes, displaying the optimized charging station terminals and the optimized routes to the optimized charging station terminals on the target smart vehicles, and automatically adjusting operation plans of the target smart vehicles to maximize operation durations of the target smart vehicles and an increase of vehicle travelled distances of the target smart vehicles, improve an operation effect of the target smart vehicles, and allow the target smart vehicles to be charged timely.

2. The intelligent analysis method for operational supervision of public transportation industry according to claim 1, wherein the basic vehicle information of S2 is specifically calculated as follows:

when the target smart vehicles are parked, driving ranges are updated according to remaining battery capacity and average energy consumption of historical driving, which specifically comprises:

obtaining current preset comprehensive power of the target smart vehicles based on the target smart vehicles' historical data and driving data of preset dispatching operation lines, determining average energy consumption models of preset historical driving of the target smart vehicles based on the target smart vehicles' historical driving data and historical battery data of battery capacity, and obtaining available battery capacity of the target smart vehicles based on the average energy consumption models of preset historical driving, and determining driving ranges of the target smart vehicles and forming travelled distance information of the target smart vehicles based on the current preset comprehensive power and the available battery capacity of the target smart vehicles; and when the target smart vehicles are running, travelled distances and actual average energy consumption of current driving are obtained in real time, which specifically comprises:

weighting and obtaining average energy consumption of current driving based on actual average energy consumption of current driving and average energy consumption of previous driving, and using current remaining battery capacity and the average energy consumption of current driving to calculate the driving ranges and form the travelled distance information of the target smart vehicles.

3. The intelligent analysis method for operational supervision of public transportation industry according to claim 2, wherein a formula for calculating the average energy consumption of current driving is as follows:

$$Q_i = C_i(d/L_d) + L_i(1 - d/L_d) \quad (3),$$

where $Q_i$ represents average energy consumption data of current driving, $C_i$ represents actual average energy consumption data of current driving, d represents current driving distance data, $L_d$ represents distance data for reaching charging station terminals, and $L_i$ represents average energy consumption data of previous driving.

4. The intelligent analysis method for operational supervision of public transportation industry according to claim 1, wherein the basic vehicle information, the road network traffic light information, the congestion information, the platform monitoring information, the historical platform passenger flow information, the charging station information, and the vehicle dispatching and operation information are transmitted through on-board units and roadside units at traffic sides.

5. The intelligent analysis method for operational supervision of public transportation industry according to claim 1, further comprising: dividing the operation areas of smart public transportation vehicles, managing multiple charging stations within the operation areas, dividing management areas into multiple areas, and dividing a day into multiple time loss level periods;

monitoring number of available charging piles in real time, counting number of vehicles entering and exiting stations through vehicle identification systems, obtaining current states of corresponding charging station terminals based on number of smart public transportation vehicles and available charging piles within the operation areas as well as time which the target smart vehicles take to reach charging station terminals on preferred dispatching operation lines, and then feeding back to the target smart vehicles.

6. A system of the intelligent analysis method for operational supervision of public transportation industry according to claim 1, comprising:

an operation information collection system, which is used to obtain basic vehicle information of the target smart vehicles, the road network traffic light information, the congestion information, the platform monitoring information, the platform historical passenger flow information, the charging station information, and the vehicle dispatching and operation information;

an operation supervision server, which is used for calculation of basic vehicle information and platform passenger flow information, current operation analysis of target smart vehicles, data updates and calibration, calculation of time for subsequently reaching charging station terminals, automatic adjustment of dispatching operation plans of smart public transportation vehicles, and real-time updates of real-time data of online vehicles; and a dispatching terminal system, which is used to receive dispatching information from the operation supervision server and transmit the same to the target smart vehicles, and is used to dispatch the target smart vehicles within the operation areas.

7. The system of the intelligent analysis method for operational supervision of public transportation industry according to claim 6, wherein the operation information collection system comprises:

on-board units, which are used to obtain basic vehicle information of the target smart vehicles, historical platform passenger flow information, and vehicle dispatching and operation information, and are mounted in vehicles;

roadside units, which are used to obtain road network traffic light information and congestion information;

platform intelligent monitoring and acquisition units, which are used to obtain information of platform passenger flows and numbers of passengers getting on and off platforms, and are installed on platforms; and charging station monitoring units, which are used to obtain charging station information.

* * * * *